United States Patent [19]

Scriven et al.

[11] Patent Number: 5,824,756
[45] Date of Patent: *Oct. 20, 1998

[54] $H_2O_2$-CATALYZED POLYMERIZATIONS FOR LINEAR POLYVINYLPYRIDINES

[75] Inventors: Eric F. V. Scriven, Greenwood; James R. Stout, Brownsburg; Ramiah Murugan, Indianapolis; James G. Keay, Carmel, all of Ind.

[73] Assignee: Reilly Industries, Inc., Indianapolis, Ind.

[ * ] Notice: The term of this patent shall not extend beyond the expiration date of Pat. No. 5,403,906.

[21] Appl. No.: 615,309

[22] PCT Filed: Oct. 25, 1994

[86] PCT No.: PCT/US94/12150

§ 371 Date: Aug. 2, 1996

§ 102(e) Date: Aug. 2, 1996

[87] PCT Pub. No.: WO95/11926

PCT Pub. Date: May 4, 1995

[51] Int. Cl.⁶ .................... C08F 2/10; C08F 2/06; C08F 26/06
[52] U.S. Cl. .................... 526/212; 526/208; 526/213; 526/217; 526/222; 526/229; 526/265
[58] Field of Search .................... 526/212, 208, 526/213, 217, 222, 229, 265

[56] References Cited

U.S. PATENT DOCUMENTS

| | | | |
|---|---|---|---|
| 3,673,168 | 6/1972 | Burke, Jr. et al. | 260/94.2 R |
| 3,828,016 | 8/1974 | Bacskai et al. | 260/88.3 R |
| 3,947,526 | 3/1976 | Bacskai | 260/878 R |
| 3,948,960 | 4/1976 | Burke, Jr. et al. | 260/407 |
| 4,824,910 | 4/1989 | Lutz | 525/185 |
| 4,957,984 | 9/1990 | Itoh et al. | 526/240 |
| 5,086,133 | 2/1992 | Itoh et al. | 526/93 |
| 5,403,906 | 4/1995 | Seriven et al. | 526/212 |

*Primary Examiner*—Joseph L. Schofer
*Assistant Examiner*—Wu C. Cheng
*Attorney, Agent, or Firm*—Woodard, Emhardt, Naughton, Moriarty & McNett Patent and Trademark Attorneys

[57] ABSTRACT

Described are preferred processes for producing linear polyvinylpyridines. The processes involve the use of hydrogen peroxide to initiate polymerization of vinylpyridine monomers in an aqueous solvent. Processes of the invention provide good reaction rates and conversions, and are particularly advantageous in achieving control of the $M_w$'s of the final product polymers.

43 Claims, No Drawings

$H_2O_2$-CATALYZED POLYMERIZATIONS FOR LINEAR POLYVINYLPYRIDINES

BACKGROUND OF THE INVENTION

The present invention resides generally in the field of polymers of vinylpyridines. More particularly, the present invention relates to polymerizations of vinylpyridine monomers to prepare linear vinyl pyridine polymers.

As further background, linear polyvinylpyridines and functionalized derivatives and copolymers thereof are useful in a wide variety of applications. For example, conductive polymers prepared from linear polyvinylpyridine and molecular iodine have been utilized as cathode materials in small solid-state batteries in which long life under low current strain is required, such as batteries used in implantable cardiac pacemakers. See, U.S. Pat. Nos. 3,660,163 (1972) and 3,773,557 (1973). Quaternary salts of polyvinylpyridines (e.g. poly(1-alkylvinylpyridinium halides)) have proven to be good negative electron beam resists for microlithography. See, K. I. Lee et al., Proc. SPIE Int. Soc. Opt. Eng., 333, 15 (1982).

Polyvinylpyridines have been used extensively in the repographic and lithographic fields because of the combination of properties ranging from adhesive to electrical properties. See, U.S. Pat. Nos. 4,041,204 (1977); 3,942,988 (1976); Ger. Offen. 3,040,047 (1981); Japan KOKAI 76 30,741 (1976); U.S. Pat. No. 4,032,339 (1977); Ger. Offen. 2,701,144 (1977); and Japan KOKAI 75 124,648 (1975). Polyvinylpyridines have also found applications in the film and photographic area. For example, solutions of polyvinylpyridine or their quaternary salts form thin films that protect the image surface of instant film prints. See, U.S. Pat. Nos. 2,874,045 (1959); 2,830,900 (1958); and 3,459,580 (1969).

Polyvinylpyridines are compatible with synthetic and natural polymers such as polyolefins (including polypropylene), polyethylene terephthalate, nylon, and cellulose, and thus find applications in plastics, alloys and blends. Fibers incorporating polyvinylpyridines show excellent dyeing intensity and are color fast [see, e.g. U.S. Pat. No. 3,361,843 (1968)] and polyvinylpyridiniumphosphate imparts permanent fire retardancy to cellulose textiles [see U.S. Pat. No. 2,992,942 (1961)] and thus polyvinylpyridines find uses in the textile industry as well.

Polyvinylpyridines further find utility in the treatment of bleached Kraft paper to increase titanium dioxide retention in pulp slurries, and electroplating applications (in particular quaternary salts), as corrosion inhibitors for metals including iron, aluminium, copper, brass, magnesium and solders, as polymerization inhibitors in $Li/TiS_2$ current-producing electrochemical cells, as emulsion stabilizers and dispersing agents (in particular acid salt and quaternary salt forms), as flocculating agents (particularly acid salt and quaternary ethylhalide forms), in ion exchange membrane preparation and many other applications. These and other uses for linear polyvinylpyridines are reviewed extensively in product literature available from Reilly Industries, Inc., Indianapolis, Ind. U.S.A., entitled "Linear Polyvinylpyridine: Properties and Applications" (1983 and 1989), to which reference can be made for additional information.

As to their preparation, linear polyvinylpyridines have been prepared by various general polymerization techniques. These have included radiation initiated, Ziegler-Natta initiated, free radical initiated and anionic initiated polymerizations. Radiation initiated polymerizations have usually been used for the preparation of graft copolymers. Ziegler-Natta initiated systems usually do not work well for the vinylpyridine systems.

Free radical (addition) polymerizations of vinylpyridines are common in the literature. Generally, there are three differing types of free radical catalyzed polymerizations, those being solution, emulsion and bulk. They are carried out more commonly using initiators such as benzoyl peroxide, cummene hydroperoxide and azobis (isobutyronitrile). Bulk polymerization of vinylpyridine catalyzed by benzoyl peroxide, hydrogen peroxide and certain other per compounds has been reported (French Pat. 849,126 (1939); CA:35:63586 (1941)), as has suspension polymerization of vinylpyridine catalyzed by water-soluble free radical initiator in the presence of small particles of solid polyolefin (U.S. Pat. Nos. 3,828,016, 3,947,526 and 4,824,910). Generally speaking, however, in known free radical-catalyzed processes it has often proven highly difficult to control the molecular weight of the vinylpyridine polymers using free radical initiators.

Anionic low temperature (−78° C.) homopolymerization of 4-vinylpyridine initiated with certain monofunctional alkalai-metal based carbanionic species have been studied in tetrahydrofuran and other solvent mixtures as reported by S. K. Varshney et al. in Macromolecules (26) 701 (1993). A significant disadvantage of this and other anionic polymerizations (see e.g. G. E. Molan et al., J. Polym. Sci. Part A-1, 4, 2336 (1966)) is the requirement of extreme dry conditions for the polymerizations which are directly related to the $M_w$ control of the product polymer. Thus, historically, anionic polymerizations of vinylpyridines have been somewhat difficult to control, making it complicated to obtain linear polyvinylpyridines of desired molecular weights, especially at lower molecular weights.

In addition to conventional polymerization methods, vinylpyridines have been reported to spontaneously polymerize upon salt formation with acids or alkyl halides. J. C. Salamone et al., Polymer Letters, 9, 13 (1971); I. Mielke et al., Macromol. Chem. 153, 307 (1972); J. C. Salamone et al, Macromolecules, 6, 475 (1973); J. C. Salamone et al., Polymer Letters, 15, 487 (1977). Such spontaneous polymerizations are relatively disadvantageous because they give rise to a mixture of the normal linear polyvinylpyridines and ionene type polymers.

In light of this background, there are needs for improved methods for polymerizing vinylpyridine monomers so as to achieve the production of linear polyvinylpyridines of controlled molecular weight. Such improved methods would also desirably be facile to conduct using readily available and inexpensive equipment and starting materials, while providing good reaction rates and product yields. The present invention addresses these needs.

SUMMARY OF THE INVENTION

One object of the invention is to provide a process for preparing linear polyvinylpyridine polymers which provides the ability to control the molecular weight of the polymer product.

Another object of the invention is to provide a process for preparing linear polyvinylpyridine polymers which provides molecular weight control without the need for utilizing extreme reaction conditions or large amounts of expensive catalysts.

Another object of the invention is to provide a process for preparing linear polyvinylpyridine polymers which provides high reaction rates to form the product polymers.

Another object of the invention is to provide processes for preparing linear polyvinylpyridine polymers which yield consistent results over a series of runs with respect to rates of reaction and product characteristics.

These and other objects are achieved by the preferred embodiments of the invention, one of which provides a process which has proven to be highly effective for producing linear polyvinylpyridines having molecular weights in the range of about 8000 to about 30000. The inventive process comprises forming a reaction mass by charging to a reactor an aqueous solvent, one or more vinylpyridine monomer(s), and hydrogen peroxide, and reacting the reaction mass to polymerize the vinylpyridine monomer(s) to form a linear polyvinylpyridine having a molecular weight of about 8000 to about 30000. In such processes the molecular weight of the product linear polyvinylpyridine can be regulated by selection of appropriate ratios of vinylpyridine monomer to hydrogen peroxide and/or by selection of appropriate reactant concentrations in the reaction mass. Generally speaking, with all else being equal, increasing hydrogen peroxide to vinylpyridine monomer ratios, and increasing monomer concentrations in the reaction mass, will yield decreasing molecular weights linear polyvinylpyridines. In the present aspect of the invention these parameters can be controlled to provide a linear polyvinylpyridine having a molecular weight in the desired range.

In one preferred mode of operating this process of the invention, the solvent includes alcohol and water. As indicated, this process allows relatively precise control of the molecular weight of the product polymer, with higher amounts of hydrogen peroxide used in a given reaction system providing lower molecular weight polymers, and lower amounts of the hydrogen peroxide initiator providing higher molecular weight polymers. The alcohol/water or other aqueous solvent preferably maintains both the vinylpyridine monomer(s) and the product polymers in solution. Additionally, although the present invention is not limited by any theory, it is believed that the hydrogen peroxide acts as both initiator and as terminator either with or without the alcohol, leading to the control of product molecular weight. Moreover, because the initiator/terminator, hydrogen peroxide, is relatively inexpensive, control of the reactions to obtain low molecular weight linear polyvinylpyridines is achieved without incurring great expense, as may be the case with other, commonly used initiators. Further, processes of the invention provide unexpectedly high reaction rates, for instance being far superior to those obtained when using alcohol alone as the solvent.

Another preferred embodiment provides a polymerization process for preparing a linear polyvinylpyridine in which measures are taken which improve the consistency in the reactivity of the system. In particular, this embodiment provides a process which includes charging to a reactor an aqueous solvent and one or more vinylpyridine monomer(s) to provide a monomer-solvent mixture, and then feeding an inert gas subsurface in the monomer-solvent mixture; After feeding the inert gas for a period of time, hydrogen peroxide is charged to the reactor to form a reaction mass, and then the reaction mass is reacted to polymerize the vinylpyridine monomer(s) to form a linear polyvinylpyridine.

Another preferred embodiment of the invention provides a method of manufacturing a linear polyvinylpyridine with consistency from batch to batch. The method comprises conducting a series of preparative processes in a reaction vessel, each process including the steps of forming a reaction mass by charging to the reaction vessel an aqueous solvent, one or more vinylpyridine monomer(s), and hydrogen peroxide, and reacting the reaction mass to polymerize the vinylpyridine monomer(s) to form a linear polyvinylpyridine; and, periodically in between preparative processes in the series, treating the interior surface of the reaction vessel with an acid so as to maintain the reactivity of its interior surface.

Another preferred embodiment of the invention provides linear polyvinylpyridines which are producable and characterized by the preferred processes of the invention.

Additional objects, features and advantages of the invention will be apparent from the following description.

DESCRIPTION OF THE PREFERRED EMBODIMENT

For the purposes of promoting an understanding of the principles of the invention, reference will now be made to certain of its embodiments and specific language will be used to describe the same. It will nevertheless be understood that no limitation of the scope of the invention is thereby intended, such alterations, further modifications and applications of the principles of the invention as described herein being contemplated as would normally occur to one skilled in the art to which the invention relates.

As indicated above, the present invention provides a unique process for preparing linear polyvinylpyridines while controlling their molecular weight ($M_w$). The process involves reacting one or more vinylpyridine monomers in an aqueous solvent, preferably including water and an organic co-solvent, such as an alcohol, which increases the solubility of the monomer in the reaction system. The reaction is conducted in the presence of a catalytic amount of hydrogen peroxide, so as to polymerize the monomer or monomers to form a linear polyvinylpyridine polymer.

Preferred vinylpyridine monomers for use in the invention are 2- and 4-vinylpyridine monomers, although other vinylpyridine monomers, for example 3-vinylpyridine monomers, are suitable. The vinylpyridine monomer used in the invention can be obtained commercially or by techniques known to the art and literature, and can be non-substituted or substituted (i.e. on its pyridine ring) with one, two, three or four groups which do not detrimentally interfere with the polymerization reaction, especially lower alkyl groups such as $C_1$ to $C_6$ alkyls, i.e. methyl, ethyl, propyl, butyl, heptyl and hexyl substituents (see, e.g., Decout, J. L. et al., *J. Prelim. Sci. Prelim. Chem. Ed.*, 18, 2391 (1980)). More preferred vinylpyridine monomers are non-substituted 2- and 4-vinylpyridine monomers, for example as can be obtained from Reilly Industries, Inc., of Indianapolis, Ind., U.S.A. Although not necessary for the present invention, it is of course preferred that the vinylpyridine monomer(s) used be of high purity, for example 90% to 95% or more pure.

In general, preferred linear polyvinylpyridines produced in accordance with the invention will comprise repeating units of the formula:

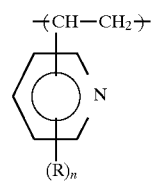

wherein n is 0 to 4 and R is a $C_1$ to $C_6$ alkyl group (in this definition, of course, each R may also differ from the other).

The amount of hydrogen peroxide initiator to use to obtain the desired product molecular weight will depend upon many factors including for example the particular reactants and solvent systems employed as well as their relative amounts (i.e. the concentration level of the reaction), and given the teachings herein will be readily determinable by the ordinarily skilled artisan. For example, as demonstrated in the Examples below, reactions run with equivalent amounts of hydrogen peroxide at higher concentrations (employing less of a given alcohol/water solvent relative to the vinylpyridine monomer(s)) will generally provide polymers of lower molecular weights, and vice versa.

In preferred processes of the invention, these parameters will be controlled to provide linear polyvinylpyridines having polystyrene equivalent $M_w$'s up to about 100,000, more preferably up to about 50,000, and most preferably up to about 30,000, for example in the range of about 8,000 to about 30,000. In these preferred processes, the molar ratio of hydrogen peroxide to vinylpyridine monomer employed will usually be about 1:1 to about 1:1000. More preferably, this ratio will be about 1:1 to about 1:100, and most preferably about 1:1 to about 1:50. Likewise, preferred processes are conducted at reaction concentration levels (i.e. (vinylpyridine monomer weight)/(vinylpyridine monomer weight+solvent weight)) of about 5% to about 50%. To prepare preferred linear polyvinylpridines with molecular weights in the 8,000–30,000 range, hydrogen peroxide/ vinylpyridine monomer molar ratios of about 1:5 to about 1:50 will generally be used while reaction concentration levels of about 10% to 50% are used. For instance, at these reaction concentration levels, hydrogen peroxide/monomer molar ratios of about 1:5 to about 1:20 will provide polymers with molecular weights in the range of about 8,000 to about 15,000.

The aqueous solvent system used can vary widely so long as the system provides an environment in which the polymerization proceeds to yield a linear polyvinylpyridine. Generally water plus at least one organic co-solvent will be used, wherein the organic co-solvent improves the solubility of the vinylpyridine monomer in the overall reaction mixture to facilitate polymerization. It has surprisingly been found that even very low amounts of a water-miscible co-solvent substantially improve the polymerizations as compared to corresponding polymerizations in water alone. For example, co-solvent:water volumetric ratios as low as about 1:99 provide substantially improved processes as compared to the use of water alone as the solvent. Thus, generally, co-solvent:water volumetric ratios of about 1:99 to about 95:5 will typically be employed in the present invention, more preferably about 1:99 to about 60:40.

The polymerization reactions of the invention can be solution polymerizations (i.e. the solvent system maintains the vinylpyridine monomer(s) and product polymers in solution) or heterogeneous (i.e. the vinylpyridine monomer (s) and/or product polymers do not remain in solution). In one preferred aspect of the invention, co-solvent:water ratios will be selected to provide solvent systems which maintain the vinylpyridine monomer(s) and polymer product in solution. This ratio will be readily determined by those practiced in the area. In preferred such solution processes, the co-solvent:water ratio will be in the range of about 25:75 to about 95:5, more preferably about 40:60 to about 60:40.

Suitable co-solvents for use in the invention will be those which provide the necessary extent of salvation of the reactants and products and which do not interfere with the polymerization reaction. Suitable such solvents include, for example, alcohols such as water-miscible mono- or polyhydric aliphatic alcohols, generally having up to about 15 carbon atoms, especially lower alcohols (i.e. $C_1$ to $C_5$ alcohols such as methanol, ethanol, propanol, butanol, and pentanol (these including both branched and unbranched forms, e.g. n-, i- or t- forms of these alcohols); ketones, for example those having from 2 to about 10 carbon atoms, e.g. dimethyl ketone, methyl ethyl ketone, and the like; esters, for example having from 2 to about 10 carbon atoms; amides, typically having from 1 to about 10 carbon atoms, such as formamide; sulfoxides, e.g. having from 2 to about 10 carbon atoms, for instance dialkylsulfoxides such as dimethylsulfoxide. Generally, low-boiling solvents, for example boiling at temperatures of about 120° C. or below, are preferred since they are more readily removed from reaction products by vacuum distillation. Also, alcohols are preferred co-solvents, especially lower alcohols such as $C_1$ to $C_4$ alcohols, most preferably methanol, ethanol, n-propanol, i-propanol, n-butanol, t-butanol, and sec-butanol.

The polyvinylpyridines produced in accordance with the invention can also be functionalized for example including to acid salt forms, N-oxide forms, quaternary salt forms, and the like. The formed free-base form linear polyvinylpyridine polymers can be converted to these functionalized forms by conventional techniques, as discussed further below.

Processes of the invention will be conducted at temperatures sufficient to achieve the desired polymerization of the vinylpyridine monomer. Generally, the temperature of the polymerizations will vary with many factors including the particular monomer or monomers employed. Typically, however, when using preferred low-boiling organic solvents in the solvent system, the polymerization will be conducted at the reflux temperature of the solvent system employed, for example at temperatures of at least about 30° C., more preferably in the range of about 30° C. to about 100° C.

Generally speaking, processes of the invention can be conducted at subatmospheric, atmospheric or superatmospheric pressures. Atmospheric pressures, as employed in the Examples, are conveniently employed and are preferred over pressurized reactions, at least for reasons of convenience and safety. If conducted at superatmospheric pressure, the processes desirably employ only moderate pressures, for example up to about 200 psi.

The hydrogen peroxide, reactants and solvents can be combined in any suitable manner to achieve the polymerization. The hydrogen peroxide can be added to the solvent/ monomer mixture, the monomer may be added to the solvent/hydrogen peroxide mixture, or the hydrogen peroxide and monomer can be concurrently added to the solvent, or all can be charged to a reaction vessel concurrently. It is preferred to charge the hydrogen peroxide last, and then heat the reaction mixture to the desired temperature for the polymerization to occur. In this regard, it has been discovered that feeding an inert gas such as nitrogen subsurface in the monomer/solvent mixture prior to the addition of hydrogen peroxide significantly improves the ensuing polymerization process, helping to maintain consistent reactivity in the system. In addition, in preferred processes, an inert gas such as nitrogen is used to blanket the vapor space above the liquid reaction mixture during the polymerization reaction.

It has also been discovered that process consistency from batch to batch can be improved by periodic treatment of the interior surfaces of the reaction vessel with an inorganic acid, such as sulfuric acid. The periodic acid treatment can be carried out after each batch if desired; however, it has been found that treatment after every several batches, for example after every 3 to 10 batches, suffices to provide good batch to batch consistency. In the applicants' preferred work to date, the reaction duration required to achieve a specified level of conversion has been monitored. When that duration begins to increase significantly, the acid treatment is applied.

The polymerization reaction will be continued for sufficient period of time to achieve substantial conversion of the vinylpyridine monomer(s) to the polymer product. The duration of the polymerization reaction required to achieve the conversion will depend upon several factors including the amount of hydrogen peroxide employed and the amounts and types of solvents and reactants employed. Typically, however, the polymerization reactions will be carried out over periods of up to about 24 hours, more typically about ½ to about 10 hours. It has been discovered that prolonged heating during the polymerization process adversely affects the color of the final product, and thus shorter reaction times are preferred.

After the polymerization reaction is completed, the linear polyvinylpyridine polymer can be conventionally isolated. For example, the co-solvents can be removed by vacuum distillation, or the reacted medium can be contacted by a precipitation solvent in which the polyvinylpyridine is insoluble but in which the remainder of the reaction components are soluble. The polymer can then be filtered from the precipitation solvent. The use of suitable recovery and isolation techniques for the formed polymer is well within the purview of one of ordinary skill in the art.

The polymer is preferably recovered in substantially pure form (i.e. substantially free from other components of the reaction medium such as unreacted monomer, co-solvent or catalyst residues). Polymer compositions having narrow molecular weight distributions are also favored. Preferred polymer compositions of the invention will have polydispersities (defined as the weight average molecular weight of the polymer divided by the number average molecular weight of the polymer, $M_w/M_n$) in the range of about 1 to 10 and more preferably in the range of about 1 to 3.

Quaternary salts can also be prepared by reacting the linear polyvinylpyridines with halogenated organics such as alkyl halides, usually $C_1$ to about $C_{10}$ alkyl halides. The linear polyvinylpyridines can be converted to their N-oxide forms by conventional procedures, for instance by reaction with hydrogen peroxide in the presence of acetic acid. See, e.g., the above-cited publication entitled "Linear Polyvinylpyridines: Properties and Applications" by Reilly Industries, Inc. The linear polyvinylpyridine can also form complexes with many metals or metal ligands, such as $Rh_4(CO)_{12}$, $Co_4(CO)_{12}$, $Co_2(CO)_8$ or Ru(II) or Rh(I).

To promote a further understanding of the present invention and its features and advantages, the following specific examples are provided. It is to be understood that these examples are illustrative and not limiting in nature. Unless indicated otherwise, $M_w$'s set forth herein are polystyrene equivalent $M_w$'s.

EXAMPLES 1–4

Preparations of Linear Polyvinylpyridines

General Procedure

Examples 1–4 set forth in Table 1 were conducted using the following procedure. To a 500 mL flask, equipped with a stirrer, thermometer, and reflux condenser, is charged 50 g (0.48 mole) 4-VP, 125 mL methanol, 125 mL water, and $H_2O_2$ (quantity depends on $M_w$ desired). The solution is heated to reflux and held until conversion to polymer is >90% (typically 2–10 hours). The polymer can be isolated by removing the solvents under vacuum. As these Examples demonstrate, variation of the $M_w$ of the final product is readily and effectively achieved by varying the ratio of $H_2O_2$ to vinylpyridine monomer. Additionally, excellent polydispersities ($M_w/M_n$) were obtained.

TABLE 1

| Example | Ex. 1 | Ex. 2 | Ex. 3 | Ex. 4 |
| --- | --- | --- | --- | --- |
| 4-VP (moles) | 0.48 | 0.48 | 0.48 | 0.48 |
| $H_2O_2$ (moles) | 0.048 | 0.143 | 0.24 | 0.333 |
| $H_2O_2$:4-Vp | 1:10 | 3:10 | 5:10 | 7:10 |
| Solvent | MeOH/$H_2O$ | MeOH/$H_2O$ | MeOH/$H_2O$ | MeOH/$H_2O$ |
| Solvent Amount (mL) | 125/125 | 125/125 | 125/125 | 125/125 |
| Temperature | reflux (82) | reflux (82) | reflux (82) | reflux (82) |
| Time (hrs) | 21 | 5 | 20 | 20 |
| Conversion (%) | | >70 | >75 | >70 |
| Mw Main Peak | 14170 | 8349 | 4081 | 2677 |
| Mw/Mn Main Peak | 2 | 2.3 | 1.8 | 1.75 |

Preferred product polymers, especially those resulting from processes utilizing alcohol/water solvents, have also possessed excellent color characteristics. For instance, in the Examples below, the prepared polymers in about 40 weight % solutions (e.g. in alcohol/water) have exhibited Gardner (Varnish) colors in the range of about 5 to about 15.

The isolated linear polyvinylpyridines can be conventionally used and derivatized. For example, functionalized linear polyvinylpyridine polymers can readily be obtained. In this regard, as used herein the term functionalized includes both partially and substantially fully functionalized polymers. In most cases, linear polyvinylpyridine polymers are desired in which at least about 10%, more preferably at least about 50% of the pendant pyridine groups, are functionalized. Representative functional forms include acid salts forms, such as those prepared from strong mineral acids such as sulfuric acid or from hydrohalides such as hydrochloric acid.

EXAMPLES 5–9

Additional Polymerizations at High Concentrations

Using the same general procedure as that set forth for Examples 1–4 above, except using 50 mL of methanol and 50 mL of water (instead of 125 mL each), the Examples set forth in Table 2 were carried out. These Examples demonstrate the capacity to carry out processes of the invention at higher concentration levels (about 35% in these instances) while still effectively achieving variation of end product $M_w$ and excellent polydispersities. Additionally, in general, these higher concentration runs provided products of lower $M_w$ than lower concentration runs (Examples 1–4) employing the same $H_2O_2$/monomer ratios.

TABLE 2

| Example | Ex. 5 | Ex. 6 | Ex. 7 | Ex. 8 | Ex. 9 |
|---|---|---|---|---|---|
| $H_2O_2$:4-VP mole ratio | 1:10 | 2:10 | 3:10 | 4:10 | 5:100 |
| Conversion by NMR | 95% | 93% | 84% | 85% | 96% |
| Mw | 8857 | 5008 | 3630 | 2910 | 22900 |
| $M_w/M_n$ | 2 | 1.8 | 1.7 | 1.6 | 2.5 |

EXAMPLE 10

Use of Ethanol/Water Solvent

To a reaction flask equipped with a reflux condenser, thermometer, and stirrer was charged 50 g (0.48 mole) 4-vinylpyridine, 6.37 g (0.096 mole at 51.28%) hydrogen peroxide, 125 mL water and 125 mL ethanol. The reaction was heated to reflux (88° C.) and held for 5½ hours. NMR indicated greater than 90% conversion to polymer. A sample of the reaction solution was analyzed by GPC and found to have Mw=9500 and Mw/Mn=2.26.

EXAMPLE 11

Use of i-Propanol/Water Solvent

To a reaction flask equipped with a reflux condenser, thermometer, and stirrer was charged 50 g (0.48 mole) 4-vinylpyridine, 6.37 g (0.096 mole at 51.28%) hydrogen peroxide, 125 mL water and 125 mL i-propanol. The reaction was heated to reflux (85° C.) and held for 20 hours. NMR indicated greater than 90% conversion to polymer. A sample of the reaction solution was analyzed by GPC and found to have Mw=8000 and Mw/Mn=2.1.

EXAMPLE 12

Use of t-Butanol solvent

To a reaction flask equipped with a reflux condenser, thermometer, and stirrer was charged 28 g (0.27 mole) 4-vinylpyridine, 3.57 g (0.0315 mole at 30%) hydrogen peroxide, 70 mL water and 70 mL t-butanol. The reaction was heated to reflux (83° C.) and held for 20 hours. NMR indicated greater than 90% conversion to polymer. A sample of the reaction solution was analyzed by GPC and found to have Mw=9570 and Mw/Mn=2.3.

EXAMPLE 13

Polymerization of 2-Vinylpyridine

To a reaction flask equipped with a reflux condenser, thermometer, and stirrer was charged 50 g (0.48 mole) 2-vinylpyridine, 6.37 g (0.096 mole at 51.28%) hydrogen peroxide, 125 mL water and 125 mL methanol. The reaction was heated to reflux (82° C.) and held for 8 hours. NMR indicated approximately 75% conversion to polymer. A sample of the reaction solution was analyzed by GPC and found to have Mw=6800 and Mw/Mn=2.3.

EXAMPLE 14

Copolymerization of 2- and 4-Vinylpyridine

To a reaction flask equipped with a reflux condenser, thermometer, and stirrer was charged 50 g (25 g, 4-vinylpyridine and 25 g 2-VP, 0.48 mole) vinylpyridine, 6.37 g (0.096 mole at 51.28%) hydrogen peroxide, 125 mL water and 125 mL methanol. The reaction was heated to reflux (82° C.) and held for 24 hours. NMR indicated approximately 75% conversion to polymer. A sample of the reaction solution was analyzed by GPC and found to have Mw=5000 and Mw/Mn=1.88.

EXAMPLE 15

Polymerization of 4-Vinylpyridine

To a reaction flask equipped with a reflux condenser, thermometer, and stirrer was charged 50 g (0.48 mole) 4-vinylpyridine, 0.64 g (0.0096 mole at 51.28%) hydrogen peroxide, 125 mL water and 125 mL methanol. The reaction was heated to reflux (82° C) and held for 5 hours. NMR indicated approximately 80% conversion to polymer. A sample of the reaction solution was analyzed by GPC and found to have Mw=30200 and Mw/Mn=1.9.

EXAMPLES 16–26

Preparations of Functionalized Linear Polyvinylpyridines

The functionalized linear polyvinylpyridines set forth in Table 3 can be prepared by reacting the free base form polyvinylpyridines of the indicated prior Examples with the indicated reagents.

TABLE 3

| Example | Polymer | Agent | Functional Form |
|---|---|---|---|
| 16 | Ex. 1 | Acetic Acid/$H_2O_2$ | N-oxide |
| 17 | Ex. 13 | Acetic Acid/$H_2O_2$ | N-oxide |
| 18 | Ex. 14 | Acetic Acid/$H_2O_2$ | N-oxide |
| 19 | Ex. 1 | HCl | HCl:Acid Salt |
| 20 | Ex. 13 | HCl | HCl:Acid Salt |
| 21 | Ex. 14 | $H_2SO_4$ | $H_2SO_4$:Acid Salt |
| 22 | Ex. 1 | Methyl Iodide | Quaternary Salt |
| 23 | Ex. 13 | Methyl Iodide | Quaternary Salt |
| 24 | Ex. 14 | Methyl Iodide | Quaternary Salt |
| 25 | Ex. 1 | Ethyl Iodide | Quaternary Salt |
| 26 | Ex. 13 | Ethyl Iodide | Quaternary Salt |

EXAMPLE 27

Use of 1% Picoline Solvent

A round bottom flask was treated with 10% aqueous sulfuric acid at room temperature, rinsed with water and allowed to thoroughly drain. 4-vinylpyridine, 150 grams (1.43 mole), 2.08 grams of 4-picoline and 206.4 grams of water were combined in the flask equipped with a reflux condenser, nitrogen sparger tube, stirrer and heating mantle. After the mixture was spared with a low stream of nitrogen at room temperature for about one hour with stirring, the sparger tube was raised to deliver nitrogen above the liquid level, 18.03 grams (0.186 mole) of 35% equeous hydrogen peroxide were added to the stirred mixture and heating begun with continued nitrogen flow. After about 30 minutes, reflux began and was continued for approximately 3½ hours to give a linear poly-4-vinylpyridine having a $M_w$ of 9,427 and a $M_w/M_n$ of 2.22. The conversion of 4-vinylpyridine to polymer was 94.8%.

EXAMPLE 28

Use of 1% Methanol Solvent

To a round bottom flask treated and equipped as in Example 27 was added 150 grams (1.43 mole) of 4-vinylpyridine, 2.08 grams of methanol and 206.37 grams of water. After sparging with nitrogen for about an hour to sparger tube was raised to deliver nitrogen above the liquid level, and 18.05 grams (0.186 mole) of 35% aqueous hydrogen peroxide were added to the stirred mixture and heating begun with continued nitrogen flow. After about 30 minutes, reflux commenced and was continued for about 3½ hours, forming a heterogeneous reaction mass in which the polymer did not remain in solution. The product linear poly-4-vinylpyridine had a $M_w$ of 8,230 and a $M_w/M_n$ of 2.12. The conversion of 4-vinylpyridine to polymer was 96.0%.

EXAMPLE 29

Use of Dimethylformamide Solvent

4-Vinylpyridine, 150 grams (1.43 mole), 114 mL of water and 114 mL of N,N-dimethylformamide were combined in a round bottom flask fitted with a stirrer, reflux condenser, a nitrogen sparger tube and heating mantle. The sparger tube was lowered so that its tip was below the liquid level in the flask and the mixture was sparged with a slow stream of nitrogen for about one hour with stirring. The sparger tube was raised above the liquid level and nitrogen flow continued providing a nitrogen blanket over the reaction mixture while 14.7 grams of 35% aqueous hydrogen peroxide (0.15 mole) was added to the reaction mixture and heating was commenced. After approximately 30 minutes reflux began and was continued for about 3½ hours, forming a heterogeneous reaction mass in which the polymer did not remain in solution. The product linear poly-4-vinylpyridine had a $M_w$ of 8903 and a $M_w/M_n$ of 1.97. The conversion of 4-vinylpyridine to polymer was 97.5%.

EXAMPLE 30

Use of methyl ethyl ketone solvent

4-Vinylpyridine, 150 grams (1.43 mole), 114 mL of water and 114 mL of methyl ethyl ketone were combined in a round bottom flask fitted with a stirrer, reflux condenser, a nitrogen sparger tube and heating mantle. The reaction mixture was stirred at room temperature and sparged with a slow stream of nitrogen below the liquid level for about one hour and 14.7 grams of 35% aqueous hydrogen peroxide (0.15 mole) was added. The sparger tube was raised above the liquid level to deliver nitrogen above the reaction mixture and heating was commenced. After approximately 30 minutes reflux began and was continued for about 6¾ hours to give a linear poly-4-vinylpyridine having a $M_w$ of 8560 and a $M_w/M_n$ of 1.81. The conversion of 4-vinylpyridine to polymer was 96.7%.

EXAMPLE 31

Use of DMSO solvent

4-Vinylpyridine, 150 grams (1.43 mole), 114 mL of water and 114 mL of dimethyl sulfoxide were combined in a round bottom flask fitted with a stirrer, reflux condenser, a nitrogen sparger tube and heating mantle. The reaction mixture was nitrogen sparged subsurface with stirring for about one hour. 14.7 grams of 35% aqueous hydrogen peroxide (0.15 mole) was added to the reaction mixture which was then heated to reflux with continued stirring under a nitrogen blanket. Reflux was continued for 1 hour to give a linear poly-4-vinylpyridine having a $M_w$ of 9483 and a $M_w/M_n$ of 1.88. The conversion of 4-vinylpyridine to polymer was 98.0%.

All publications cited herein are indicative of the level of ordinary skill in the art, and each is hereby incorporated by reference in its entirety as if individually incorporated by reference and fully set forth.

While the invention has been described in detail in the foregoing description, the same is to be considered as illustrative and not restrictive in character, it being understood that only the preferred embodiments have been described and that all changes and modifications that come within the spirit of the invention are desired to be protected.

What is claimed is:

1. A process for producing a linear polyvinylpyridine, comprising:
   (a) forming a reaction mass by charging to a reactor an aqueous solvent including at least one organic co-solvent and water in a volumetric ratio of 1:99 to 95:5, respectively, one or more vinylpyridine monomer(s), and hydrogen peroxide;
   (b) reacting the reaction mass to polymerize the vinylpyridine monomer(s) to form a reacted mass containing a linear polyvinylpyridine having a molecular weight of up to about 100,000;
   (c) distilling the reacted mass after step (b) containing the linear polyvinylpyridine to remove the organic co-solvent and form a distilled product containing the linear polyvinylpyridine; and
   (d) reacting the linear polyvinylpyridine after step (c) to prepare a functionalized linear polyvinyloyridine selected from an acid salt form, a quaternary salt form, and an N-oxide form.

2. The process of claim 1 wherein the functionalized linear polyvinylpyridine is an N-oxide form or quaternary salt form.

3. The process of claim 1 wherein the vinylpyridine monomer is 2-vinylpyridine, 4-vinylpyridine, or a mixture thereof.

4. The process of claim 1 wherein the organic co-solvent is selected from the group consisting of alcohols, esters, ketones, picolines, amides and sulfoxides.

5. The process of claim 4 wherein the co-solvent and water are, included in a ratio of about 60:40 to about 40:60, respectively.

6. The process of claim 5 wherein the co-solvent is an alcohol.

7. The process of claim 6 wherein the alcohol is selected from the group methanol, ethanol, propanol or butanol.

8. The process of claim 6 wherein the vinylpyridine monomer is 2-vinylpyridine, 4-vinylpyridine, or a mixture thereof.

9. The process of claim 8 wherein the alcohol is methanol.

10. The process of claim 9 wherein the methanol and water are included in a ratio of about 60:40 to about 40:60, respectively.

11. The process of claim 10 wherein the reacting occurs under refluxing conditions.

12. The process of claim 11 wherein the reacting is conducted for about 2 to about 10 hours.

13. The process of claim 8 wherein said functionalized linear polyvinylpyridine is an N-oxide form.

14. The process of claim 13 wherein the alcohol is selected from the group consisting of methanol, ethanol, propanol and butanol.

15. The process of claim 14 wherein said distilling is under vacuum.

16. The process of claim 13 wherein the ratio of hydrogen peroxide to vinylpyridine monomer is about 1:1 to about 1:10.

17. A process for preparing a linear polyvinylpyridine, comprising:

forming a reaction mass by charging to a reactor an aqueous solvent including at least one organic co-solvent and water, one or more vinylpyridine monomers, and hydrogen peroxide;

heating the reaction mass at a pressure less than 200 psi to polymerize the vinylpyridine monomer(s) to form a reacted product including a linear polyvinylpyridine;

distilling the reacted product to remove the organic co-solvent and recover the linear polyvinylpyridine.

18. The process of claim 17 wherein the vinylpyridine monomer(s) is 2-vinylpyridine or 4-vinylpyridine or a mixture thereof and said pressure is atmospheric or subatmospheric pressure.

19. The process of claim 18 which includes charging 2-vinylpyridine as the sole vinylpyridine monomer, and wherein the solvent includes alcohol and water.

20. The process of claim 19 which includes charging 4-vinylpyridine as the sole vinylpyridine monomer, and wherein the solvent includes alcohol and water.

21. The process of claim 19 which includes charging both 2-vinylpyridine and 4-vinylpyridine as the vinylpyridine monomers, and wherein the solvent includes alcohol and water.

22. A polymerization process for preparing a linear polyvinylpyridine, comprising:

charging to a reactor an aqueous solvent and one or more vinylpyridine monomer(s) to provide a monomer-solvent mixture;

feeding an inert gas subsurface in said monomer-solvent mixture;

after said feeding, charging hydrogen peroxide to said reactor to form a reaction mass; and reacting the reaction mass to polymerize the vinylpyridine monomer(s) to form a linear polyvinylpyridine.

23. The polymerization process of claim 22 wherein the inert gas is hydrogen.

24. The polymerization process of claim 22 wherein the aqueous solvent comprises water and organic co-solvent.

25. The process of claim 24 wherein the organic co-solvent is selected from the group consisting of alcohols, picolines, esters, ketones, amides and sulfoxides.

26. The process of claim 25 wherein the organic co-solvent is an alcohol.

27. The process of claim 26 wherein the alcohol is a $C_1$ to $C_4$ alcohol.

28. The process of claim 27 wherein the alcohol is methanol.

29. The process of claim 24 wherein the vinylpyridine monomer(s) is selected from the group consisting of 2-vinylpyridine, 4-,vinylpyridine, and mixtures thereof.

30. The process of claim 29 wherein the vinylpyridine monomer(s) is 4-vinylpyridine.

31. The process of claim 29 wherein the vinylpyridine monomer(s) is 2-vinylpyridine.

32. The process of claim 29 wherein the vinylpyridine monomer(s) is a mixture of 2- and 4-vinylpyridine.

33. A polymerization process, comprising:

forming a reaction mass by charging to a reactor an aqueous solvent including at least one organic co-solvent and water in a volumetric ratio of 1:99 to 95:5, respectively, one or more vinylpyridine monomer(s), and hydrogen peroxide;

(b) subjecting the reaction mass of step (a) to polymerization conditions to form a reacted mixture containing a linear polymer having a molecular weight of up to about 100,000;

(c) removing the organic co-solvent from the reacted mixture after step (b); and (d) reacting the linear polymer after step (c) to prepare an acid salt form, quaternary salt form, or N-oxide form thereof.

34. The process of claim 33, wherein step (d) includes preparing a quaternary salt form polymer.

35. The process of claim 33, wherein step (d) includes preparing an N-oxide form polymer.

36. The process of claim 33, wherein step (d) includes preparing a acid salt form polymer.

37. The process of claim 33, wherein the organic co-solvent is an alcohol.

38. The process of claim 34, wherein the organic co-solvent is selected from methanol, ethanol, propanol and butanol.

39. The process of claim 35, wherein the organic co-solvent is selected from methanol, ethanol, propanol and butanol.

40. The process of claim 36, wherein the organic co-solvent is selected from methanol, ethanol, propanol and butanol.

41. The process of claim 33, wherein the polymerization conditions include a pressure of less than about 200 psi.

42. The process of claim 41, wherein the polymerization conditions include a pressure of atmospheric or subatmospheric pressure.

43. The process of claim 42, wherein the organic co-solvent is selected from methanol, ethanol, propanol and butanol.

* * * * *

UNITED STATES PATENT AND TRADEMARK OFFICE
CERTIFICATE OF CORRECTION

PATENT NO. : 5,824,756
DATED : October 20, 1998
INVENTOR(S) : Eric F.V. Scriven et al.

It is certified that error appears in the above-identified patent and that said Letters Patent is hereby corrected as shown below:

In col. 5, line 62, please delete "salvation" and insert in lieu thereof —solvation—.

In col. 13, line 39, the last line of claim 23, please delete "hydrogen" and insert in lieu thereof —nitrogen—.

In col. 13, line 41, the last line of claim 24, please insert —an— in between "and" and "organic".

Signed and Sealed this

Thirtieth Day of November, 1999

Attest:

Q. TODD DICKINSON

*Attesting Officer*  *Acting Commissioner of Patents and Trademarks*